US009872218B2

(12) United States Patent
Nagasaka et al.

(10) Patent No.: US 9,872,218 B2
(45) Date of Patent: *Jan. 16, 2018

(54) USER TERMINAL, CELLULAR BASE STATION, AND PROCESSOR

(71) Applicant: KYOCERA CORPORATION, Kyoto (JP)

(72) Inventors: Yushi Nagasaka, Yokohama (JP); Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/906,760

(22) PCT Filed: Aug. 4, 2014

(86) PCT No.: PCT/JP2014/070530
§ 371 (c)(1),
(2) Date: Jan. 21, 2016

(87) PCT Pub. No.: WO2015/020017
PCT Pub. Date: Feb. 12, 2015

(65) Prior Publication Data
US 2016/0157154 A1    Jun. 2, 2016

(30) Foreign Application Priority Data
Aug. 7, 2013   (JP) .................................. 2013-164056

(51) Int. Cl.
*H04W 36/22*      (2009.01)
*H04W 36/14*      (2009.01)
(Continued)

(52) U.S. Cl.
CPC ....... *H04W 36/22* (2013.01); *H04W 36/0022* (2013.01); *H04W 36/14* (2013.01);
(Continued)

(58) Field of Classification Search
CPC ..... H04W 36/22; H04W 36/14; H04W 36/08; H04W 36/0088
See application file for complete search history.

(56) References Cited

U.S. PATENT DOCUMENTS 5,999,816 A    12/1999  Tiedemann, Jr. et al.
2003/0076852 A1  4/2003  Fukui
(Continued)

FOREIGN PATENT DOCUMENTS

JP    H09135477 A    5/1997
JP    2003134031 A   5/2003
(Continued)

OTHER PUBLICATIONS

3GPP TR 37.834., 3rd Generation Partnership Project; Technical Specification Group Radio Access Network; Study on WLAN/3GPP Radio Interworking (Release 12), May 2013, pp. 1-14, V0.3.0.
(Continued)

*Primary Examiner* — Romani Ohri
(74) *Attorney, Agent, or Firm* — Studebaker & Brackett PC (57) ABSTRACT

UE 100 transmits and receives traffic to and from eNB 200 in a cellular communication system capable of cooperating with a WLAN system. The UE 100 determines, on the basis of a determination parameter related to a situation of the UE 1001, whether or not an offload in which the traffic is transitioned to the WLAN system should be performed, when the UE 100 is selected as a target terminal subject to the offload. The UE 100 transmits, to the eNB 200, a rejection notification that related to rejection to the offload when the UE 100 determines that the offload should not be performed.

2 Claims, 9 Drawing Sheets (51) Int. Cl.
- *H04W 36/00* (2009.01)
- *H04W 36/36* (2009.01)
- *H04W 84/04* (2009.01)
- *H04W 84/12* (2009.01)
- *H04W 36/32* (2009.01)

(52) U.S. Cl.
CPC ........ *H04W 36/36* (2013.01); *H04W 36/0083* (2013.01); *H04W 36/32* (2013.01); *H04W 84/042* (2013.01); *H04W 84/12* (2013.01)

(56) References Cited

U.S. PATENT DOCUMENTS

| | | | |
|---|---|---|---|
| 2003/0193910 A1 | 10/2003 | Shoaib et al. | |
| 2011/0222523 A1* | 9/2011 | Fu | H04W 36/22 370/338 |
| 2013/0070641 A1* | 3/2013 | Meier | H04W 8/005 370/254 |
| 2013/0183935 A1* | 7/2013 | Holostov | H04W 12/06 455/411 |
| 2013/0303175 A1 | 11/2013 | Yoshihara | |
| 2014/0092742 A1* | 4/2014 | Chou | H04W 52/0258 370/235 |
| 2014/0376515 A1* | 12/2014 | Lei | H04W 36/0061 370/331 |

FOREIGN PATENT DOCUMENTS

| | | |
|---|---|---|
| JP | 2003333639 A | 11/2003 |
| JP | 2008-104185 A | 5/2008 |
| WO | 2012105684 A1 | 8/2012 |

OTHER PUBLICATIONS

LG Electronics, 3GPP TSG-RAN2 Meeting #82, R2-132055, Comparison of Access Network Selection Solutions, May 20-24, 2013, pp. 1-6.

International Search Report of PCT/JP2014/070530 dated Nov. 4, 2014.

Written Opinion of PCT/JP2014/070530 dated Nov. 4, 2014.

An Office Action issued by the Japanese Patent Office on Mar. 14, 2017, which corresponds to Japanese Patent Application No. 2013-164056 and is related to U.S. Appl. No. 14/906,760; with Concise Statement of Relevance.

* cited by examiner

USER TERMINAL, CELLULAR BASE STATION, AND PROCESSOR

TECHNICAL FIELD

The present invention relates to a user terminal used in a cellular communication system capable of cooperating with a wireless LAN system, a cellular base station therefor, and a processor therefor.

BACKGROUND ART

In recent years, the use of a user terminal including a cellular communication unit and a wireless LAN communication unit (so-called dual terminal) is widely spread. Further, the number of wireless LAN access points managed by an operator of a cellular communication system increases.

Therefore, in 3GPP (3rd Generation Partnership Project) which is a project aiming to standardize a cellular communication system, consideration is given to a technology capable of strengthening cooperation between a cellular communication system and a wireless LAN system.

For example, when traffic transmitted and received between a user terminal and a cellular base station is transitioned to a wireless LAN system, it is possible to reduce the traffic load of the cellular base station (offload).

As a method of performing such an offload, there is proposed a method in which the cellular base station sets a WLAN measurement to a user terminal subject to offload, the user terminal reports a WLAN measurement result to the cellular base station, and then the cellular base station transmits an offload command to the user terminal on the basis of the report (see Non Patent Literature 1).

CITATION LIST

Non Patent Literature

[NPL 1] 3GPP technical report "TR 37.834 V0.3.0" May, 2013

SUMMARY OF INVENTION

From the viewpoint of the cellular base station, as a method of selecting a user terminal subject to offload, it may be possible to consider a method in which a user terminal having a large amount of radio resources used is selected.

However, from the viewpoint of the user terminal, when a user terminal subject to offload is selected on the basis only on such a selection criterion, a preferable selection may be not performed. The offload should not be performed on a user terminal such as a user terminal around which no wireless LAN access point is present, a user terminal which is moving, or a user terminal whose battery remaining amount is small.

Therefore, an object of the present invention is to provide a user terminal with which it is possible to properly select a user terminal subject to offload, a cellular base station therefor, and a processor therefor.

A user terminal according to a first aspect transmits and receives traffic to and from a cellular base station in a cellular communication system capable of cooperating with a wireless LAN system. The user terminal comprises a controller configured to determine, on the basis of a determination parameter related to a situation of the user terminal, whether or not an offload in which the traffic is transitioned to the wireless LAN system should be performed, when the user terminal is selected as a target terminal subject to the offload. The controller transmits, to the cellular base station, a rejection notification that related to rejection to the offload when the controller determines that the offload should not be performed.

A cellular base station according to a second aspect transmits and receives traffic to and from a user terminal in a cellular communication system capable of cooperating with a wireless LAN system. The cellular base station comprises a controller configured to exclude the user terminal from a target terminal subject to offload in which the traffic is transitioned to the wireless LAN system, when the user terminal is selected as a target terminal subject to the offload and when the controller receives a rejection notification related to rejection to the offload from the user terminal.

A processor according to a third aspect provided in a user terminal that transmits and receives traffic to and from a cellular base station in a cellular communication system capable of cooperating with a wireless LAN system. The processor executes a process of determining, on the basis of a determination parameter related to a situation of the user terminal, whether or not an offload in which the traffic is transitioned to the wireless LAN system should be performed, when the user terminal is selected as a target terminal subject to the offload; and a process of transmitting, to the cellular base station, a rejection notification related to rejection to the offload when it is determined that the offload should not be performed.

DESCRIPTION OF EMBODIMENTS

Overview of Embodiments

A user terminal according to a first embodiment and a second embodiment transmits and receives traffic to and from a cellular base station in a cellular communication system capable of cooperating with a wireless LAN system.

The user terminal comprises a controller configured to determine, on the basis of a determination parameter related to a situation of the user terminal, whether or not an offload in which the traffic is transitioned to the wireless LAN system should be performed, when the user terminal is selected as a target terminal subject to the offload. The controller transmits, to the cellular base station, a rejection notification that related to rejection to the offload when the controller determines that the offload should not be performed.

In the first embodiment, the determination parameter is information indicating whether or not a wireless LAN access point is present around the user terminal. The controller determines that the offload should not be performed when no wireless LAN access point is present around the user terminal.

In the first embodiment, the determination parameter is information indicating whether or not the user terminal is moving. The controller determines that the offload should not be performed when the user terminal is moving.

In the first embodiment, the determination parameter is information indicating a battery remaining amount of the user terminal. The controller determines that the offload should not be performed when the battery remaining amount falls below a threshold value.

In the first embodiment, the determination parameter is information indicating a power consumption level of the user terminal. The controller determines that the offload should not be performed when the power consumption level exceeds a threshold value.

In an operation pattern 1 according to the first embodiment, the user terminal further comprises a receiver configured to receive, from the cellular base station, a wireless LAN measurement command indicating that the user terminal is selected as a target terminal subject to the offload. The controller transmits the rejection notification to the cellular base station as a response to the wireless LAN measurement command when the controller determines that the offload should not be performed.

In an operation pattern 2 according to the first embodiment, the user terminal further comprises a receiver configured to receive, from the cellular base station, a wireless LAN measurement command indicating that the user terminal is selected as a target terminal subject to the offload. The controller transmits, to the cellular base station, the rejection notification together with a wireless LAN measurement report to report a result of the wireless LAN measurement when the controller determines that the offload should not be performed.

In an operation pattern 3 according to the first embodiment, the user terminal further comprises a receiver configured to receive an offload command, that instructs an execution of the offload, from the cellular base station. The controller transmits, to the cellular base station, the rejection notification as a response to the offload command when it is determined that the offload should not be performed.

In the first embodiment, the controller includes rejection reason information indicating a reason for rejection in the rejection notification when the rejection notification is transmitted to the cellular base station.

In the second embodiment, the user terminal further comprises a transmitter configured to transmit, to the cellular base station, a terminal information notification including the determination parameter before the user terminal is selected as a target terminal subject to the offload.

A cellular base station according to the first embodiment and the second embodiment transmits and receives traffic to and from a user terminal in a cellular communication system capable of cooperating with a wireless LAN system. The cellular base station comprises a controller configured to exclude the user terminal from a target terminal subject to offload in which the traffic is transitioned to the wireless LAN system, when the user terminal is selected as a target terminal subject to the offload and when the controller receives a rejection notification related to rejection to the offload from the user terminal.

In the second embodiment, the cellular base further comprises a receiver configured to receive, from the user terminal, a terminal information notification including a determination parameter related to a situation of the user terminal before the user terminal is selected as a target terminal subject to the offload. The controller selects a user terminal subject to the offload on the basis of the determination parameter.

In the second embodiment, the determination parameter is information indicating whether or not a wireless LAN access point is present around the user terminal. The controller excludes a user terminal, around which no wireless LAN access point is present, from a target terminal subject to the offload.

In the second embodiment, the determination parameter is information indicating whether or not the user terminal is moving. The controller excludes a user terminal which is moving, from a target terminal subject to the offload.

In the second embodiment, the determination parameter is information indicating a battery remaining amount of the user terminal. The controller excludes a user terminal in which the battery remaining amount falls below a threshold value from a target terminal subject to the offload.

In the second embodiment, the determination parameter is information indicating a power consumption level of the user terminal. The controller excludes a user terminal in which a power consumption level exceeds a threshold value, from a target terminal subject to the offload.

A processor according to the first embodiment and the second embodiment provided in a user terminal that transmits and receives traffic to and from a cellular base station in a cellular communication system capable of cooperating with a wireless LAN system. The processor executes a process of determining, on the basis of a determination parameter related to a situation of the user terminal, whether or not an offload in which the traffic is transitioned to the wireless LAN system should be performed, when the user terminal is selected as a target terminal subject to the offload; and a process of transmitting, to the cellular base station, a rejection notification related to rejection to the offload when it is determined that the offload should not be performed.

First Embodiment

Hereinafter, with reference to the drawing, embodiments will be described in which a cellular communication system (LTE system) configured to comply with the 3GPP standards is cooperated with a wireless LAN (WLAN) system.

(System Configuration)

Figure 1:
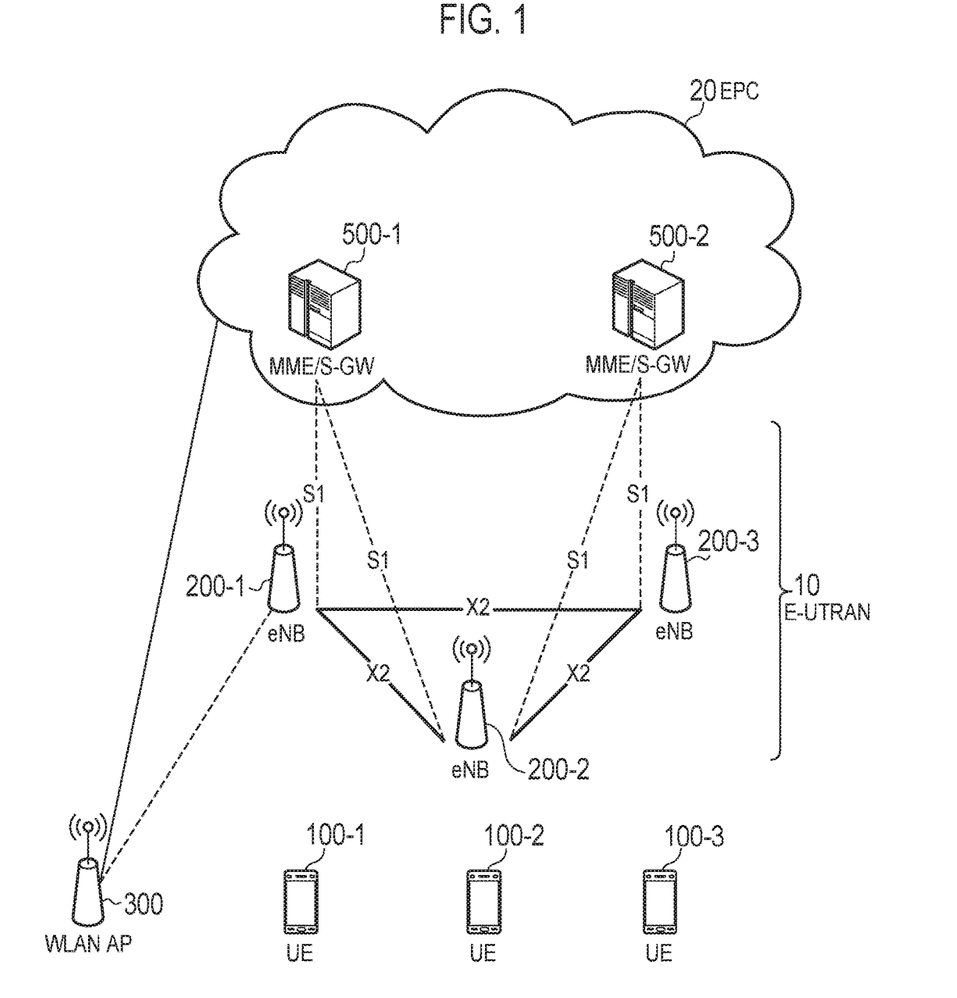
FIG. 1 is a system configuration diagram according to a first embodiment and a second embodiment.

FIG. 1 is a system configuration diagram according to first embodiment. As shown in FIG. 1, the cellular communication system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both cellular communication scheme and WLAN communication scheme.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MMES (Mobility Management Entities)/S-GWs (Serving-Gateways) 500. The MME is a network node for performing various mobility controls, for example, for the UE 100, and corresponds to a controller. The S-GW is a network node that performs transfer control of user data and corresponds to a mobile switching center.

The WLAN system includes a WLAN access point (WLAN AP) 300. The WLAN system is configured to be in compliance with the IEEE 802.11 standards, for example. The WLAN AP 300 performs communication with the UE 100 in a frequency band different from a cellular frequency band (WLAN frequency band). The WLAN AP 300 is connected to the EPC 20 via a router, and the like.

Further, it may be also possible that the eNB 200 and the WLAN AP 300 are located individually, and it may be possible that the eNB 200 and the WLAN AP 300 are located at a same place (Collocated). As one mode of the "Collocated", the eNB 200 and the WLAN AP 300 may be directly connected with each other through any interface of an operator.

Next, configurations of the UE 100, the eNB 200, and the WLAN AP 300 will be described.

Figure 2:
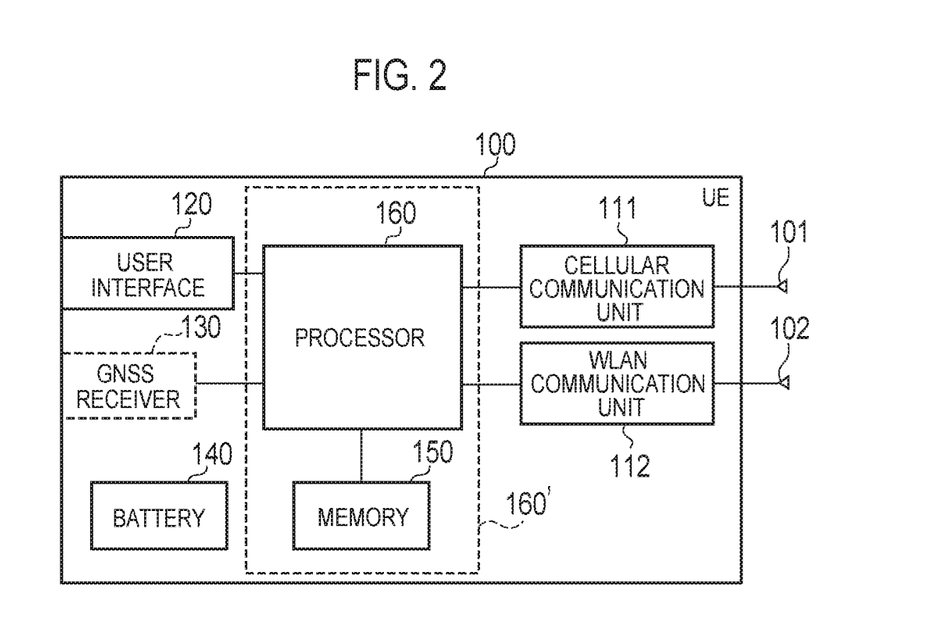
FIG. 2 is a block diagram of a UE (user terminal) according to the first embodiment and the second embodiment.

FIG. 2 is a block diagram of the UE 100. As shown in FIG. 2, the UE 100 includes: antennas 101 and 102; a cellular transceiver (cellular communication unit) 111; a WLAN transceiver (WLAN communication unit) 112; a user interface 120; a GNSS (Global Navigation Satellite System) receiver 130; a battery 140; a memory 150; and a processor 160. The memory 150 and the processor 160 configure a control unit. The UE 100 may not have the GNSS receiver 130. It is noted that the memory 150 may be integrally formed with the processor 160, and this set (that is, a chipset) may be called a processor 160'.

The antennas 101 and the cellular transceiver 111 are used for transmitting and receiving a cellular radio signal. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antennas 102 and the WLAN transceiver 112 are used for transmitting and receiving a WLAN radio signal. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
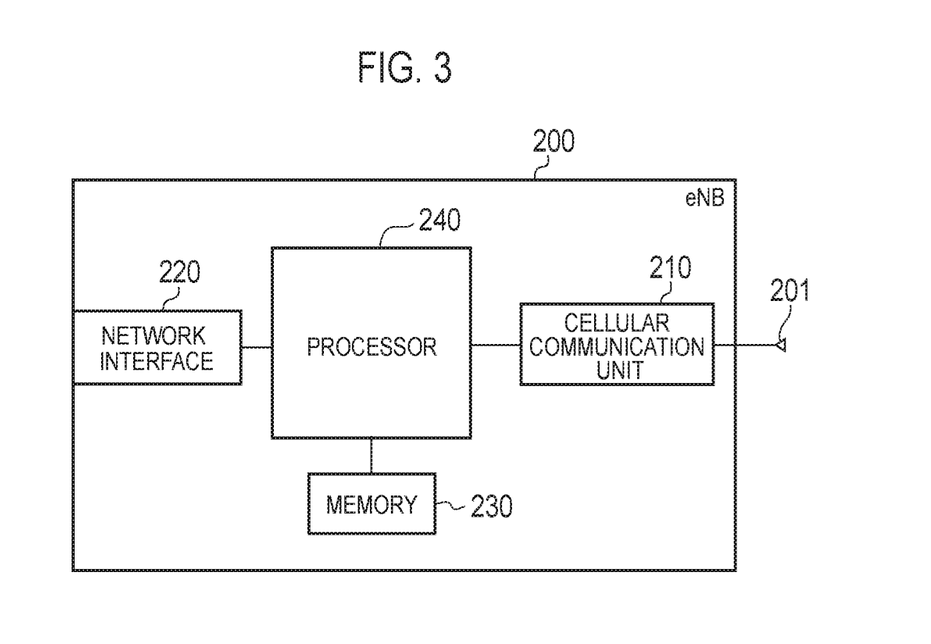
FIG. 3 is a block diagram of an eNB (cellular base station) according to the first embodiment and the second embodiment.

FIG. 3 is a block diagram of the eNB 200. As shown in FIG. 3, the eNB 200 includes antennas 201, a cellular transceiver 210, a network interface 220, a memory 230, and a processor 240. The memory 230 and the processor 240 configure a control unit.

The antennas 201 and the cellular transceiver 210 are used for transmitting and receiving a cellular radio signal. The cellular transceiver 210 converts the baseband signal output from the processor 240 into the cellular radio signal, and transmits the same from the antenna 201. Furthermore, the cellular transceiver 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. The network interface 220 may be used for communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
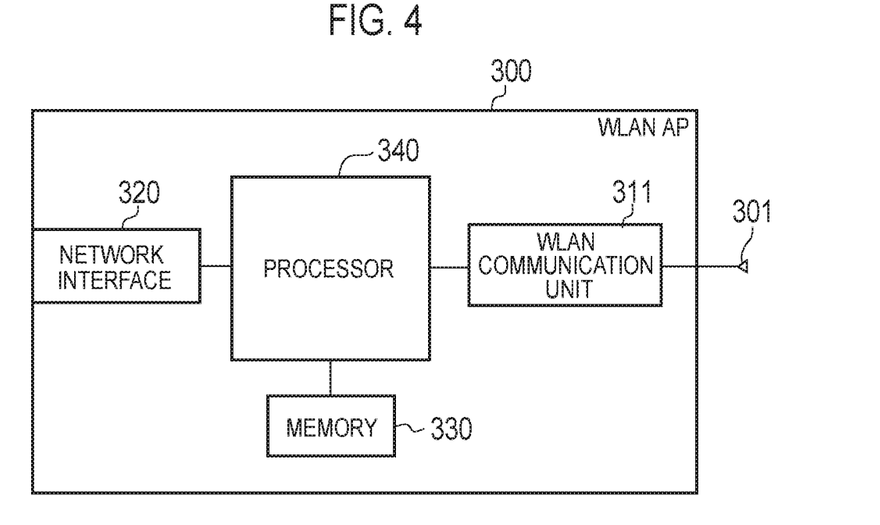
FIG. 4 is a block diagram of an AP (wireless LAN access point) according to the first embodiment and the second embodiment.

FIG. 4 is a block diagram of the WLAN AP 300. As shown in FIG. 4, the WLAN AP 300 includes antennas 301, a WLAN communication unit 311, a network interface 320, a memory 330, and a processor 340.

The antennas 301 and the WLAN communication unit 311 are used for transmitting and receiving a WLAN radio signal. The WLAN communication unit 311 converts a baseband signal output from the processor 340 into a WLAN radio signal and transmits the same from the antenna 301. Further, the WLAN communication unit 311 converts a WLAN radio signal received by the antenna 301 into a baseband signal and outputs the same to the processor 340.

The network interface 320 is connected to the EPC 20 via a router, and the like. Further, the network interface 320 is used for communication with the eNB 200 via the EPC 20.

The memory 330 stores a program executed by the processor 340 and information used for a process by the processor 340. The processor 340 includes a baseband processor that performs modulation and demodulation, encoding and decoding, and the like on a baseband signal and a CPU that performs various processes by executing a program stored in the memory 330.

Figure 5:
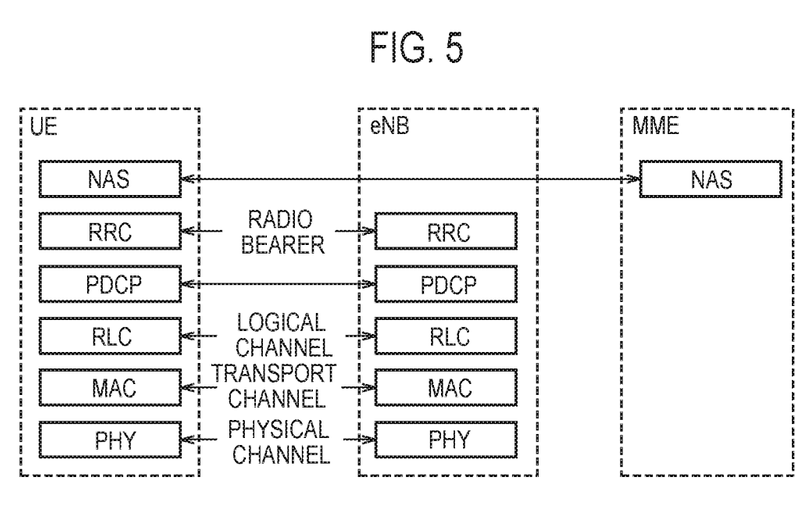
FIG. 5 is a protocol stack diagram of a radio interface in an LTE system.

FIG. 5 is a protocol stack diagram of a radio interface in the cellular system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme and the like) of an uplink and a downlink, and an allocated resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management or mobility management, for example.

Figure 6:
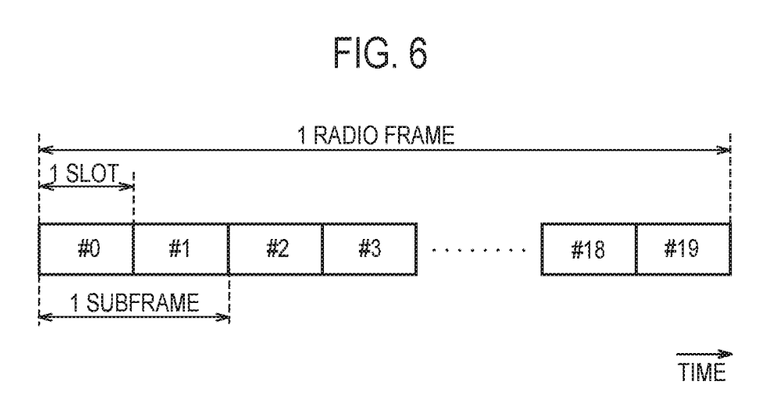
FIG. 6 is a configuration diagram of a radio frame used in the LTE system.

FIG. 6 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As shown in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources allocated to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Furthermore, in the downlink, reference signals such as cell-specific reference signals are distributed and arranged in each subframe.

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH).

(Operation According to First Embodiment)

Next, an operation according to the first embodiment will be described.

(1) Operation Overview

In the first embodiment, an operation environment is assumed in which the WLAN AP 300 is provided in the coverage area of the eNB 200. The WLAN AP 300 is an AP managed by an operator (Operator controlled AP). When the eNB 200 establishes a connection with a large number of UEs 100, the traffic load of the eNB 200 increases. Thus, it is possible to reduce the traffic load of the eNB 200 when traffic (user data) transmitted and received between the UE 100 and the eNB 200 is transitioned to the WLAN system (offload).

In the first embodiment, in order to perform such an offload, the eNB 200 sets a WLAN measurement to the UE 100 subject to offload, the UE 100 reports a WLAN measurement result to the eNB 200, and the eNB 200 transmits an offload command to the UE 100 on the basis of the report.

Figure 7:
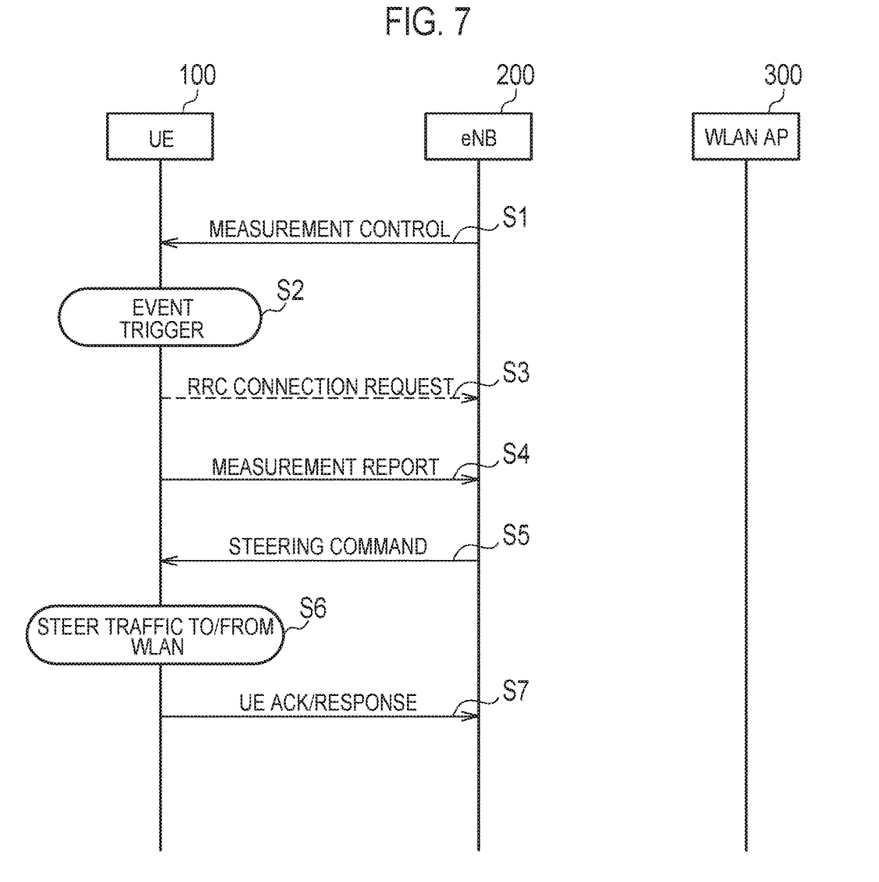
FIG. 7 is a sequence diagram illustrating a basic operation according to the first embodiment.

FIG. 7 is a sequence diagram illustrating a basic operation according to the first embodiment. In an initial state of the sequence, the UE 100 is in a state where an RRC connection is established with the eNB 200 (in a connected state).

As shown in FIG. 7, in step S1, the eNB 200 transmits, to the UE 100 subject to offload, a WLAN measurement command to control a WLAN measurement. The WLAN measurement command includes an identifier of the WLAN AP 300 (WLAN identifier) to be measured by the UE 100. Further, the WLAN measurement command includes trigger information indicating a trigger by which a WLAN measurement report for reporting a result of the WLAN measurement is transmitted to the eNB 200.

The UE 100 that receives the WLAN measurement command performs the WLAN measurement in accordance with the WLAN measurement command. For example, the UE 100 measures a received power of a beacon signal from the WLAN AP 300, and the like, for the WLAN identifier included in the WLAN measurement command.

In step S2, the UE 100 detects an event as a transmission trigger for the WLAN measurement report, on the basis of the trigger information included in the WLAN measurement command. Here, when the UE 100 is transitioned to an idle state, the UE 100 establishes again an RRC connection with the eNB 200 in order to transmit the WLAN measurement report to the eNB 200 (step S3).

In step S4, the UE 100 transmits the WLAN measurement report to report a result of the WLAN measurement, to the eNB 200. The WLAN measurement report includes a WLAN identifier and a WLAN measurement result (received power of a beacon signal, and the like), for example.

In step S5, the eNB 200 that receives the WLAN measurement report transmits, to the UE 100, a Steering command (offload command) to instruct the execution of the offload, on the basis of the WLAN measurement report, the load of RAN, and the like. It is noted that the Steering command may be a command to instruct a traffic transition (offload cancellation) from the WLAN to the eNB 200, in addition to a command to instruct a traffic transition (offload) from the eNB 200 to the WLAN.

In step S6, the UE 100 that receives the offload command executes an offload. That is, the UE 100 switches so that the traffic to be transmitted and received to and from the eNB 200 is passed on to the WLAN AP 300. It is noted that when the UE 100 does not establish connection with the WLAN AP 300 when the offload command is received, the UE 100 establishes connection with the WLAN AP 300 prior to the offload.

In step S7, the UE 100 transmits, to the eNB 200, a response responding to the offload command.

In such a sequence, when the eNB 200 selects a UE 100 subject to offload, the selection of the UE 100 subject to offload may be inappropriate. The offload should not be performed for a UE 100 such as a UE 100 around which no WLAN AP 300 is present, a UE 100 which is moving, or a UE 100 whose battery remaining amount is low.

In the first embodiment, when the UE 100 is selected as a target terminal subject to offload in which traffic is transitioned to the WLAN system, the UE 100 determines on the basis of a determination parameter related to the situation of the UE 100 whether or not the offload should be performed. Detail of the determination parameter (a determination parameter 1 to a determination parameter 4) will be described later.

When the UE 100 determines on the basis of the determination parameter that the offload should not be performed, the UE 100 transmits a rejection notification, to the eNB 200, related to rejection to the offload. A timing to transmit the rejection notification to the eNB 200 (an operation pattern 1 to an operation pattern 3) will be described later.

The eNB 200 excludes the UE 100 from a target terminal subject to offload, when the UE 100 is selected as a target terminal subject to offload in which traffic is transitioned to the WLAN system, and when the eNB 200 receives a rejection notification related to rejection to the offload from the UE 100. Accordingly, it is possible to properly select a UE 100 subject to offload.

(2) Determination Parameter

It is possible to use at least one of the determination parameter 1 to the determination parameter 4 below as the determination parameter described above.

The determination parameter 1 is information indicating whether or not a WLAN AP 300 is present around the UE 100. For example, if the UE 100 receives a beacon signal from a WLAN AP 300, then it may be considered that the WLAN AP 300 is present around the UE 100. Alternatively, when the UE 100 holds location information of a WLAN AP 300 (AP location information), if difference between GNSS location information and AP location information of the UE 100 (that is, distance) is small, then it may be possible to consider that the WLAN AP 300 is present around the UE 100. The UE 100 determines on the basis of the determination parameter 1 that the offload should not be performed, and transmits a rejection notification when no WLAN AP 300 is present around the UE 100. Thus, it is possible to avoid a UE 100 in a state where it is impossible to be offloaded from being selected as a UE 100 subject to offload.

The determination parameter 2 is information indicating whether or not the UE 100 is moving. For example, if a change of GNSS location information of the UE 100 per unit time is larger than a predetermined amount, then it may be considered that the UE 100 is moving. Alternatively, if a handover frequency or a cell reselection frequency per unit time of the UE 100 is larger than a predetermined frequency, then it may be possible to consider that the UE 100 is moving. The UE 100 determines on the basis of the determination parameter 2 that the offload should not be performed and transmits a rejection notification when the UE 100 is moving. The UE 100 that is moving passes through the coverage area of the AP 300 in a short time. Accordingly, when the UE 100 that is moving is excludable from a target subject to offload, it is possible to avoid an inefficient offload from being performed.

The determination parameter 3 is information indicating a battery remaining amount of the UE 100. Information indicating a battery remaining amount may be the voltage value of the battery 140 or an index indicating the voltage level of the battery 140. The UE 100 determines on the basis of the determination parameter 3 that the offload should not be performed and transmits a rejection notification when the battery remaining amount falls below the threshold value. When an offload is performed, the power consumption of the UE 100 increases, so that there occur problems that the UE 100 runs out of its battery, or that an outgoing call (including an emergency call) becomes impossible, and the like. Accordingly, when the UE 100 whose battery remaining amount is small is excludable from a target subject to offload, it is possible to avoid such problems.

The determination parameter 4 is information indicating the power consumption level of the UE 100. For example, when the UE 100 is set to a power saving mode, the power consumption level of the UE 100 is small. When the UE 100 is set to a high performance mode, the power consumption level of the UE 100 is large. The UE 100 determines on the basis of the determination parameter 4 that the offload should not be performed and transmits a rejection notification when the power consumption level exceeds the threshold value. When the offload is performed, the power consumption of the UE 100 increases, so that there are problems on the UE 100 whose power consumption level is high that the power consumption exceeds an allowance because of the offload, and the like. Accordingly, when the UE 100 whose power consumption level is high is excludable from a target subject to offload, it is possible to avoid such problems.

(3) Operation Pattern 1

Figure 8:
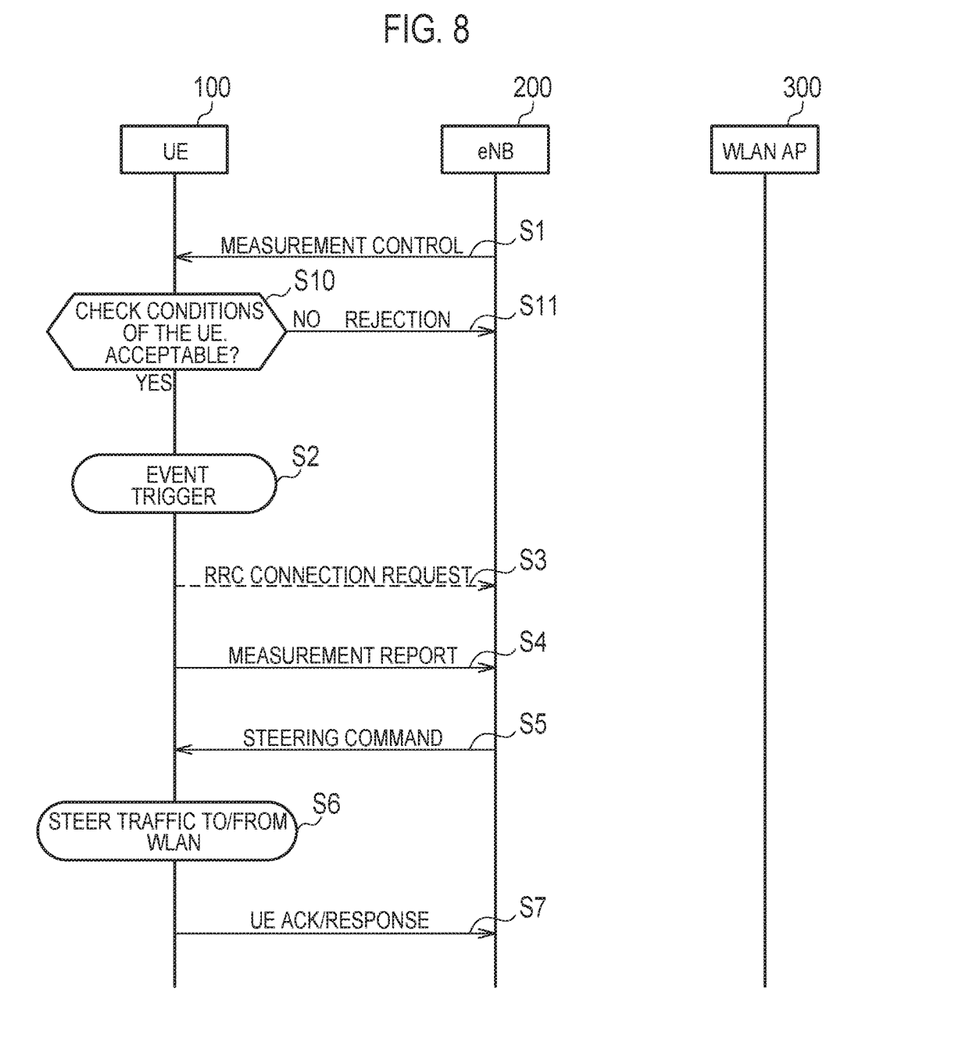
FIG. 8 is a sequence diagram of an operation pattern 1 according to the first embodiment.

FIG. 8 is sequence diagram of an operation pattern 1 according to the first embodiment. Here, differences from a basic operation described above will be mainly described.

As shown in FIG. 8, in step S1, the UE 100 receives a WLAN measurement command indicating that the UE 100 is selected as a target terminal subject to offload, from the eNB 200.

In step S10, the UE 100 determines on the basis of the determination parameter whether or not an offload should be performed.

When the UE 100 determines that an offload should not be performed (step S10: No), in step S11, the UE 100 transmits a rejection notification to the eNB 200 as a response to the WLAN measurement command. The UE 100 may include rejection reason information indicating a reason for the rejection into the rejection notification. Examples of the reason for the rejection include "no WLAN AP 300 is present in its neighborhood", "the UE 100 is moving", "the battery remaining amount is small", and "power consumption level is high". The eNB 200 which receives the rejection notification excludes the UE 100 from a target terminal subject to offload.

On the other hand, when the UE 100 determines that an offload should be performed (step S10: Yes), the UE 100 detects an event to be a transmission trigger for a WLAN measurement report, on the basis of trigger information included in the WLAN measurement command in step S2. The subsequent operations are similar to the basic operation described above.

(4) Operation Pattern 2

Figure 9:
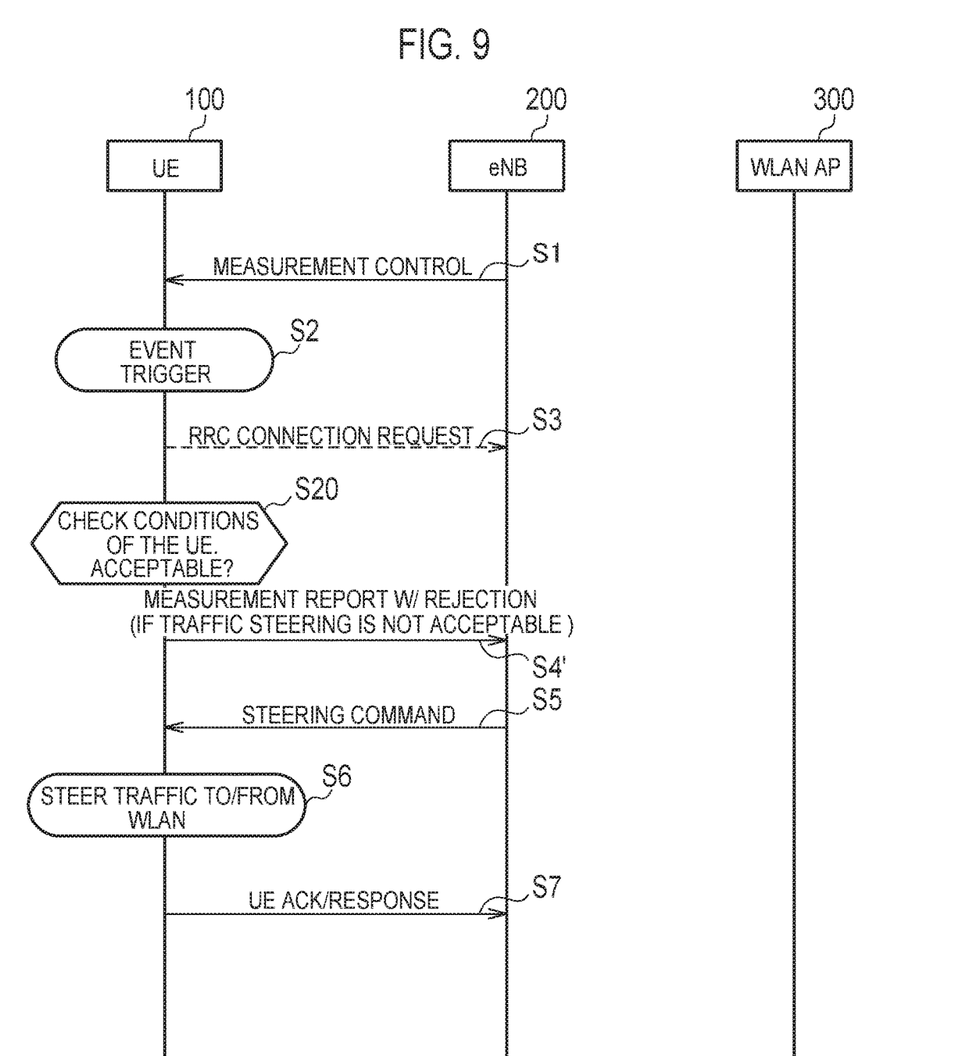
FIG. 9 is a sequence diagram of an operation pattern 2 according to the first embodiment.

FIG. 9 is a sequence diagram of an operation pattern 2 according to the first embodiment. Here, differences from a basic operation described above will be mainly described.

As shown in FIG. 9, steps S1 to S3 are similar to the basic operation described above.

In step S20, the UE 100 determines on the basis of the determination parameter whether or not an offload should be performed.

When the UE 100 determines that an offload should not be performed (step S20: No), in step S4', the UE 100 transmits, to the eNB 200, a rejection notification together with the WLAN measurement report to report a result of the WLAN measurement. The UE 100 may transmit the rejection notification included into the WLAN measurement report, and may transmit the WLAN measurement report and the rejection notification by an individual message. The UE 100 may include rejection reason information into the rejection notification. The eNB 200 which receives the rejection notification excludes the UE 100 from a target terminal subject to offload.

On the other hand, when the UE 100 determines that an offload should be performed, the UE 100 transmits the WLAN measurement report to the eNB 200, without transmitting the rejection notification. The subsequent operations are similar to the basic operation described above.

(5) Operation Pattern 3

Figure 10:
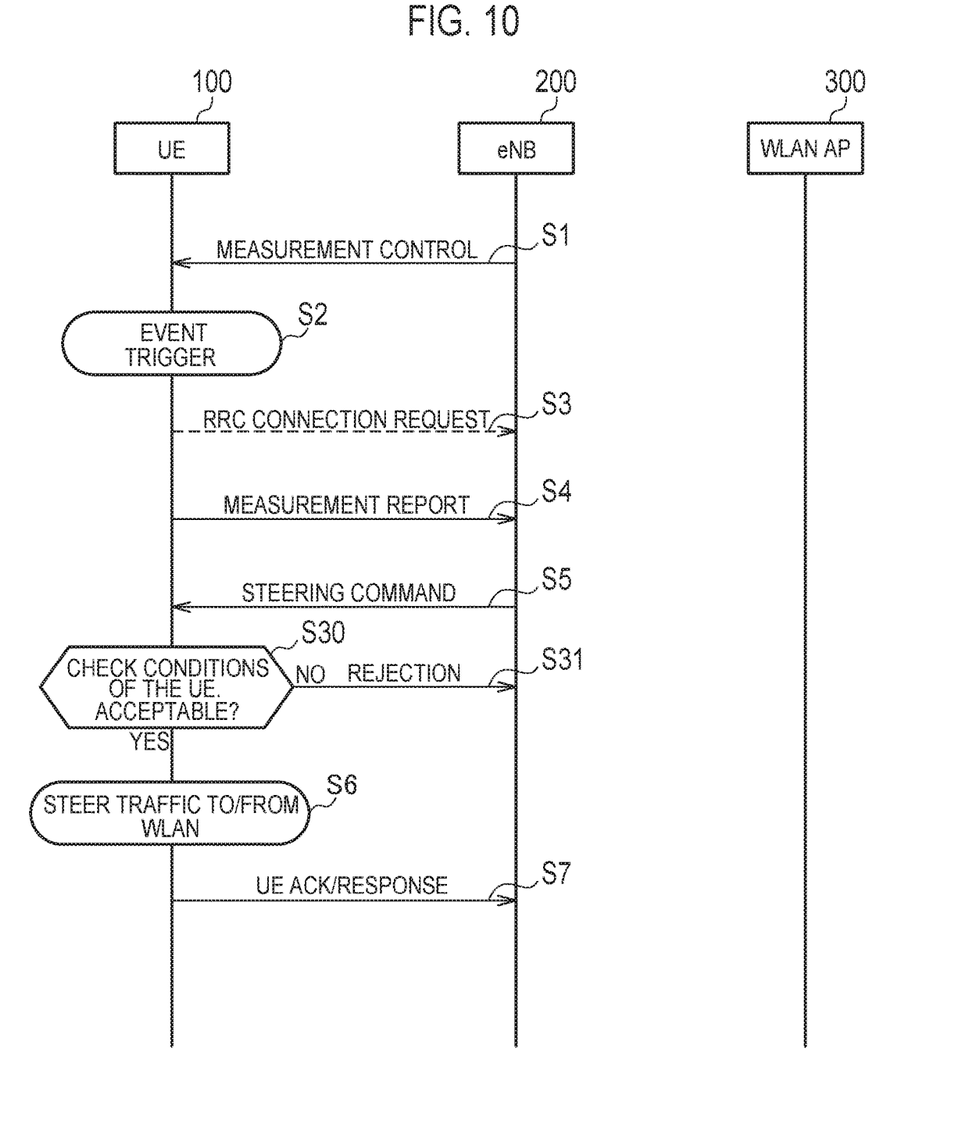
FIG. 10 is a sequence diagram of an operation pattern 3 according to the first embodiment.

FIG. 10 is a sequence diagram of an operation pattern 3 according to the first embodiment. Here, differences from a basic operation described above will be mainly described.

As shown in FIG. 10, steps S1 to S5 are similar to the basic operation described above. Specifically, in step S5, the UE 100 receives an offload command to instruct the execution of an offload from the eNB 200.

In step S30, the UE 100 determines on the basis of the determination parameter whether or not an offload should be performed.

When it is determined that an offload should not be performed (step S30: No), in step S31, the UE 100 transmits a rejection notification to the eNB 200 as a response to the offload command. It is noted that, the UE 100 may include rejection reason information into the rejection notification. The eNB 200 which receives the rejection notification excludes the UE 100 from a target terminal subject to offload.

On the other hand, when it is determined that an offload should be performed (step S30: Yes), in step S6, the UE 100 executes the offload. The subsequent operations are similar to the basic operation described above.

(Summary of First Embodiment)

As described above, when the UE 100 is selected as a target terminal subject to offload, the UE 100 determines on the basis of the determination parameter related to a situation of the UE 100 whether or not an offload should be performed. When the UE 100 determines on the basis of the determination parameter that the offload should not be performed, the UE 100 transmits a rejection notification, to the eNB 200, related to rejection to the offload. The eNB 200 excludes the UE 100 from a target terminal subject to offload when the UE 100 is selected as a target terminal subject to offload, and when the eNB 200 receives a rejection notification related to rejection to the offload from the UE 100. Accordingly, it is possible to properly select a UE 100 subject to offload.

In the operation pattern 1 according to the first embodiment, it is possible to reduce the process load of the UE 100 and to reduce an amount of consumption of the radio resource involved in the WLAN measurement report because the rejection notification is transmitted to the eNB 200 without transmitting the WLAN measurement report to the eNB 200. On the other hand, in the operation pattern 3 according to the first embodiment, because the UE 100 makes determination immediately before a timing when the offload should be performed, it is possible to properly make the determination on the basis of the latest situation of the UE 100. The operation pattern 2 according to the first embodiment has a property intermediate that of the operation pattern 1 and that of the operation pattern 3.

Second Embodiment

A second embodiment will be described while focusing on the differences from the first embodiment. A system configuration and a basic operation according to the second embodiment are similar to those in the first embodiment.

(Operation According to Second Embodiment)

An operation according to the second embodiment is performed prior to the basic operations described above. Specifically, the UE 100 transmits, to the eNB 200, a terminal information notification including the determination parameter described above (at least one of the determination parameter 1 to the determination parameter 4) before the UE 100 is selected as a target terminal subject to offload. The terminal information notification may be "UE Capability Information" that is one of RRC messages.

The eNB 200 receives the terminal information notification including the determination parameter from the UE 100 before the UE 100 is selected as a target terminal subject to offload. And, the eNB 200 selects the UE 100 subject to offload on the basis of the determination parameter. For example, the eNB 200 excludes a UE 100, around which no WLAN AP 300 is present, from a target terminal subject to offload, on the basis of the determination parameter 1. The eNB 200 excludes a UE 100 which is moving from a target terminal subject to offload, on the basis of the determination parameter 2. The eNB 200 excludes a UE 100 whose battery remaining amount falls below the threshold value from a target terminal subject to offload, on the basis of the determination parameter 3. The eNB 200 excludes a UE 100 whose power consumption level exceeds the threshold value from a target terminal subject to offload, on the basis of the determination parameter 3.

Figure 11:
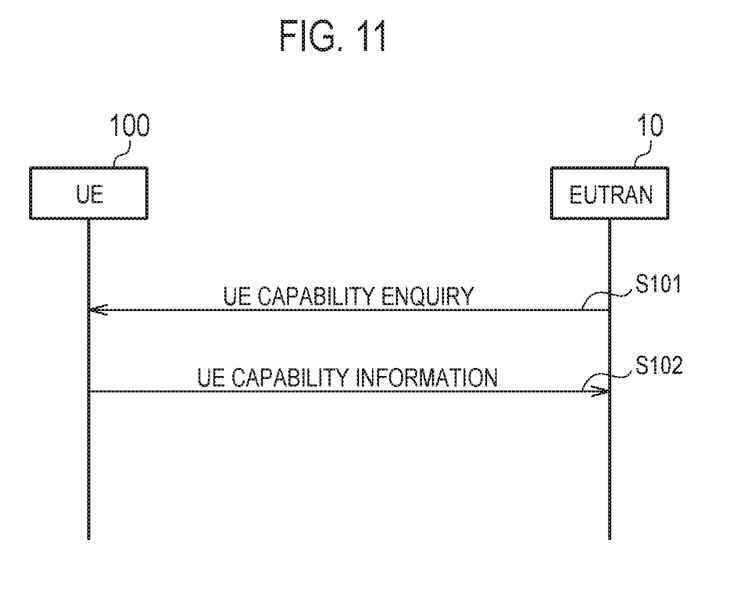
FIG. 11 is a sequence diagram according to the second embodiment.

FIG. 11 is a sequence diagram according to the second embodiment.

As shown in FIG. 11, in step S101, the eNB 200 transmits, to the UE 100, a UE Capability Enquiry to request to transmit a terminal information notification (UE Capability Information).

In step S102, the UE 100 which receives the UE Capability Enquiry, transmits, to the eNB 200, the terminal information notification including the determination parameter (UE Capability Information).

(Summary of Second Embodiment)

As described above, the UE 100 transmits, to the eNB 200, the terminal information notification including the determination parameter before the UE 100 is selected as a target terminal subject to offload. The eNB 200 receives the terminal information notification including the determination parameter from the UE 100 before the UE 100 is selected as a target terminal subject to offload. The eNB 200 selects a UE 100 subject to offload on the basis of the determination parameter. Thus, it is possible to properly select a UE 100 subject to offload.

OTHER EMBODIMENTS

In the second embodiment described above, the eNB 200 selects a UE 100 subject to offload, on the basis of the determination parameter received from the UE 100. However, the eNB 200 may select a UE 100 subject to offload without relying on the determination parameter received from the UE 100. For example, the eNB 200 measures an elapsed time after a UE 100 handovers to a cell of the eNB 200, excludes a UE 100 in which the elapsed time is shorter than a fixed time from a target terminal subject to offload. Thus, it is possible to include a UE 100 which is in a cell of the eNB 200 in the long term as a target terminal subject to offload, and to exclude a UE 100 which only temporarily passes through the a cell of the eNB 200 from a target terminal subject to offload.

The second embodiment described above is assumed to be used together with the first embodiment. However, the second embodiment may be executed separately from the first embodiment, and the second embodiment may be executed independently.

In each of the embodiments described above, as one example of the cellular communication system, the LTE system is described, however, the present invention is not limiting to the LTE system, and the present invention may be applied to systems other than the LTE system.

In each operation sequence described above, an operation performed by the eNB 200 (base station) may be operated by another network device (for example, an RNC) instead of the base station.

In addition, the entire content of Japanese Patent Application No. 2013-164056 (filed on Aug. 7, 2013) is incorporated in the present specification by reference.

INDUSTRIAL APPLICABILITY

According to the present invention, it is possible to provide a user terminal with which it is possible to properly select a user terminal subject to offload, a cellular base station therefor, and a processor therefor.

The invention claimed is:

1. A user terminal comprising:
a controller including at least one processor and at least one memory, and configured to:
transmit a wireless local area network (WLAN) measurement report to a cellular base station, the WLAN measurement report including a WLAN measurement result;
receive an offload command from the cellular base station, the offload command instructing an offload, the offload being an operation in which the user terminal steers traffic from the cellular base station to a WLAN access point while maintaining a connection between the user terminal and the cellular base station;
after transmitting the WLAN measurement report, attempt to connect to the WLAN access point in response to receiving the offload command;
in response to failing in connecting to the WLAN access point, determine whether a reason for the failure of connection to the WLAN access point is a first reason or a second reason, the first reason being an issue of a radio link between the user terminal and the WLAN access point, and the second reason being an internal issue of the user terminal; and
transmit a failure indication to the cellular base station in response to failing in connecting to the WLAN access point, the failure indication indicating that the user terminal fails in connecting to the WLAN access point, wherein the failure indication includes information indicating whether the reason is the first reason or the second reason.

2. An apparatus for controlling a user terminal, comprising:
at least one processor and at least one memory, the at least one processor configured to: transmit a wireless local area network (WLAN) measurement report to a cellular base station, the WLAN measurement report including a WLAN measurement result;
receive an offload command from the cellular base station, the offload command instructing an offload, the offload being an operation in which the user terminal steers traffic from the cellular base station to a WLAN access point while maintaining a connection between the user terminal and the cellular base station;
after transmitting the WLAN measurement report, attempt to connect to the WLAN access point in response to receiving the offload command;
in response to failing in connecting to the WLAN access point, determine whether a reason for the failure of connection to the WLAN access point is a first reason or a second reason, the first reason being an issue of a radio link between the user terminal and the WLAN access point, and the second reason being an internal issue of the user terminal; and
transmit a failure indication to the cellular base station in response to failing in connecting to the WLAN access point, the failure indication indicating that the user terminal fails in connecting to the WLAN access point, wherein the failure indication includes information indicating whether the reason is the first reason or the second reason.

* * * * *